United States Patent [19]

Appelman

[11] Patent Number: 6,112,250
[45] Date of Patent: *Aug. 29, 2000

[54] RECOMPRESSION OF FILES AT AN INTERMEDIATE NODE IN A NETWORK SYSTEM

[75] Inventor: Barry Appelman, Great Falls, Va.

[73] Assignee: America Online, Inc., Vienna, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/630,846

[22] Filed: Apr. 11, 1996

[51] Int. Cl.[7] ...................................................... H04B 1/66
[52] U.S. Cl. ........................... 709/247; 709/246; 709/203
[58] Field of Search ........................... 395/200.01, 200.3, 395/200.77, 200.76, 200.33; 341/50; 375/122; 709/247, 246, 203

[56] References Cited

U.S. PATENT DOCUMENTS

| | | | |
|---|---|---|---|
| 5,131,016 | 7/1992 | Broughton et al. | 375/122 |
| 5,276,898 | 1/1994 | Kiel et al. | 395/800 |
| 5,410,671 | 4/1995 | Elgamal et al. | 395/425 |
| 5,506,580 | 4/1996 | Whiting et al. | 341/51 |
| 5,557,749 | 9/1996 | Norris | 395/200.18 |
| 5,574,906 | 11/1996 | Morris | 395/601 |
| 5,581,366 | 12/1996 | Merchant et al. | 358/400 |

FOREIGN PATENT DOCUMENTS

0 616 455   9/1994   European Pat. Off. .

*Primary Examiner*—Zarni Maung
*Assistant Examiner*—Saleh Najjar
*Attorney, Agent, or Firm*—Fish & Richardson P.C.

[57] ABSTRACT

A recompression server that automatically decompresses selected pre-compressed data streams and recompresses the decompressed data to a greater degree than the original pre-compressed data. In one embodiment, the recompression server determines from a request whether a requested file is pre-compressed. In another embodiment, the recompression server determines from a retrieved requested file's name or attributes whether the file is pre-compressed. Optionally, the recompression server may compress requested but previously uncompressed files. As another option, the recompression server may cache frequently requested files in re-compressed form to further optimize the bandwidth of a wide area network. Such caching can be done on-line or off-line.

58 Claims, 5 Drawing Sheets

RECOMPRESSION OF FILES AT AN INTERMEDIATE NODE IN A NETWORK SYSTEM

BACKGROUND OF THE INVENTION

1. Field of the Invention

This invention relates to electronic computers and network systems, and more particularly to a network server for automatically decompressing selected pre-compressed data streams and recompressing the decompressed data to a greater degree than the original pre-compressed data.

2. Description of Related Art

FIG. 1 is a diagram of a prior art wide area public network system, such as the Internet. A first node 2 (which may be a workstation, a terminal, a personal computer, or the like), can communicate with a second node 4 (which may be a network server, a minicomputer or mainframe computer, a personal computer, or the like) by an apparently direct connection 6. In reality, the connection between node 2 and node 4 is made through a network "cloud" of connections 8, generally through one or more "proxy" server computers 10 that help route requests through the network 8. Such proxy server computers 10 generally include storage devices 12 for storing various sorts of data.

Each connection between a pair of nodes 2, 4 consumes some amount of communication bandwidth. In order to conserve bandwidth, it is common to pre-compress files to be transmitted from one node 2 to another 4. For example, graphics images may be pre-compressed using commonly available file formats, such as the Graphics Interchange Format (GIF), Tagged Interchange File Format (TIFF), and JPEG. (It should be understood that the term "files" as used herein includes live data streams, collections or archives of files, portions of files, data blocks, etc.)

One drawback of the present system is that such pre-compressed files may not be optimally compressed, thus wasting bandwidth. However, a requester node 2 generally has no ability to cause a provider node 4 to optimize compression of requested files.

Another existing problem is that many files on provider nodes 4 are not pre-compressed at all. While some compression may be achieved automatically by use of transport protocols or modems that include a compression function, there is no general solution to this problem.

The present invention is based on the inventor's recognition of a need for optimizing bandwidth usage in a network system for pre-compressed data files, and a need for general method of compressing files that are not pre-compressed.

The present invention provides a solution to these problems.

SUMMARY OF THE INVENTION

The present invention is a recompression server that automatically decompresses selected pre-compressed data streams and recompresses the decompressed data to a greater degree than the original pre-compressed data. In one embodiment, the recompression server determines from a request whether a requested file is pre-compressed. In another embodiment, the recompression server determines from a retrieved requested file's name or attributes whether the file is pre-compressed.

Optionally, the recompression server may compress requested but previously uncompressed files. As another option, the recompression server may cache frequently requested files in re-compressed form to further optimize the bandwidth of a wide area network. Such caching can be done on-line or off-line.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1:
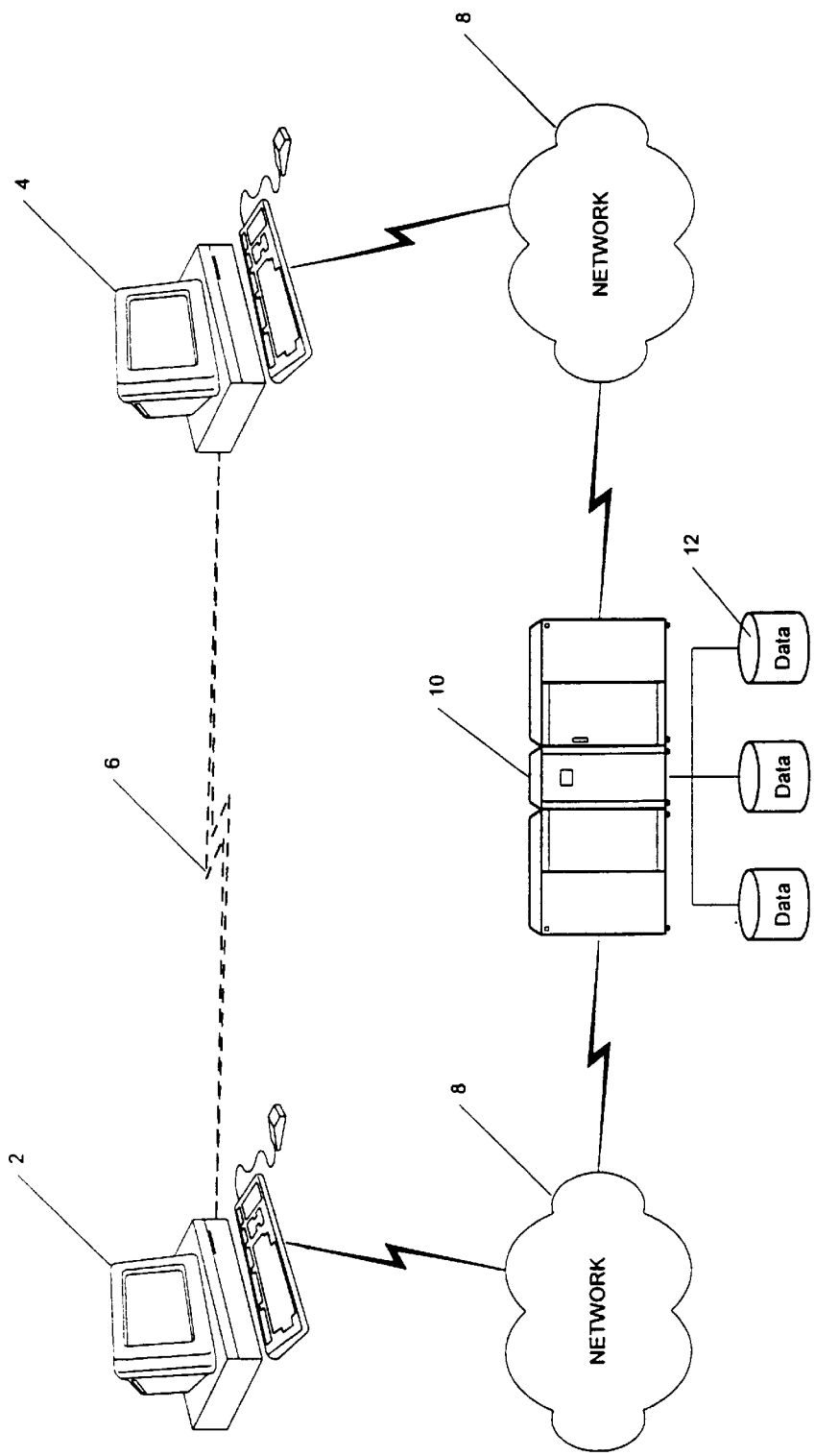
FIG. 1 is a diagram of a prior art wide area network system, such as the Internet.
Figure 2:
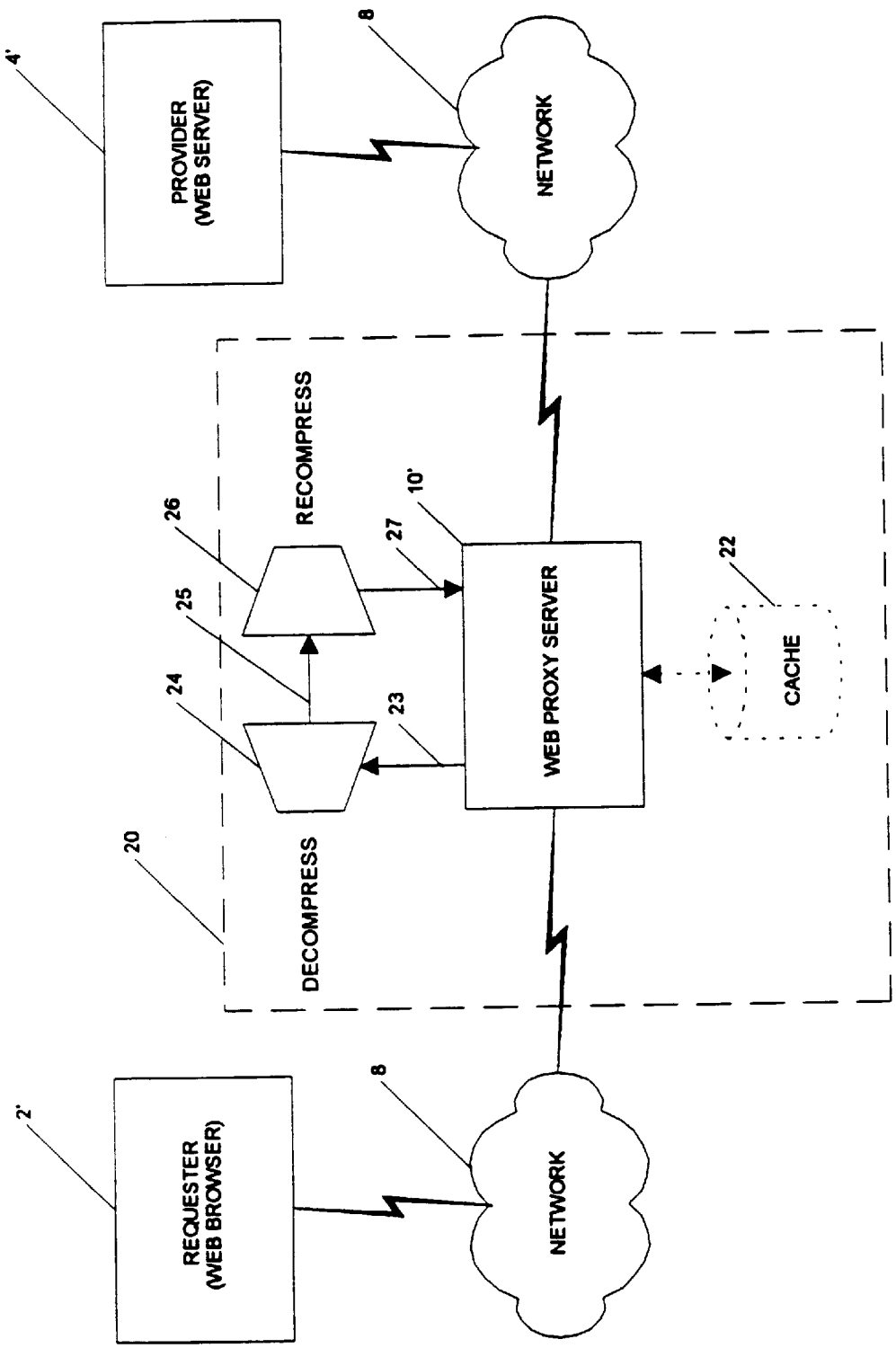
FIG. 2 is a diagram of the preferred hardware embodiment of the present invention.

FIG. 2 is a diagram of the preferred hardware embodiment of the present invention. The diagram shown in FIG. 2 is similar to the diagram shown in FIG. 1. A requester 2' (for example, a web browser on the World Wide Web service provided by the Internet) can send file requests to a provider 4' (for example, a web server on the Internet) via a network 8. Each request is processed through a recompression server 20 in accordance with the present invention.

The recompression server 20 includes a web proxy server 10' having an optional cache 22. The recompression server 20 also includes a data path from the web proxy server 10' along a first connection 23 through a decompressor 24, along a second connection 25 through a recompressor 26, and along a third connection 27 back to the web proxy server 10'.

The components along the data path 23–27 can comprise hardware, a software or firmware programmed dedicated processor, or simply be software routines executed on the general processor(s) of the web proxy server 10', as a matter of design choice.

Figure 3:
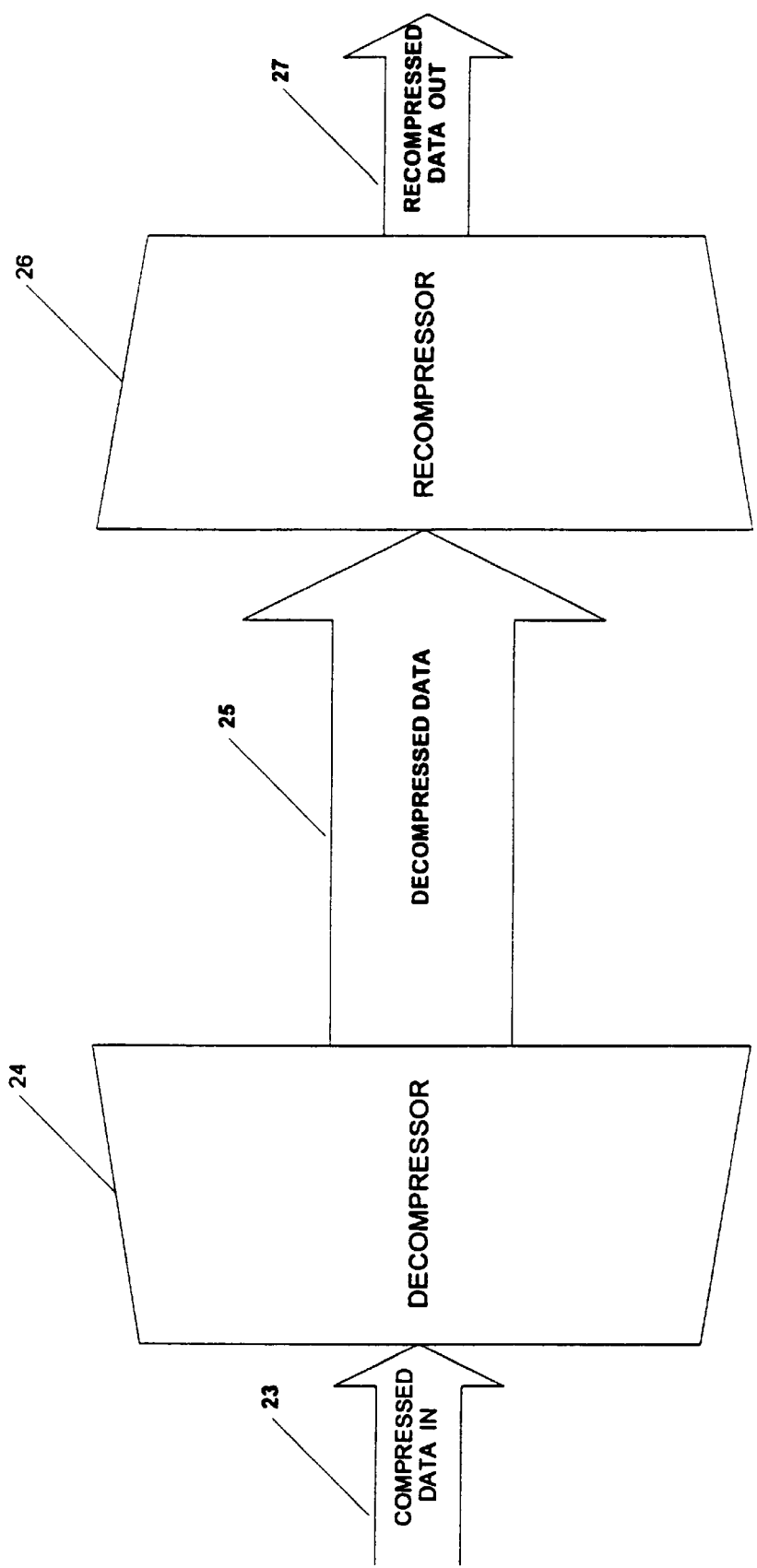
FIG. 3 is a block diagram showing the flow of selected data through the recompression server of FIG. 2.

FIG. 3 is a block diagram showing the flow of selected data through the recompression server of FIG. 2. When a file requested from a provider 4' passes through the recompression server 20, a determination is made in the web proxy server 10' whether the file is pre-compressed. If so, the compressed data 23 is routed along a first connection 23 to a decompressor 24. For example, if a requested data file is a graphics imaged compressed using the GIF standard, the file extension (.GIF) indicates that the file is pre-compressed. The file would be routed through the decompressor 24, which includes conventional decompression code for decompressing the GIF file. The decompressed data is routed along a second connection 25 (either directly or after temporary storage, such as in RAM or a mass storage device) to a recompressor 26.

The recompressor 26 re-compresses the decompressed data using any algorithm that provides a better compression ratio than the original compression. More than one recompression algorithm may be used if desired, to provide better compression for different data types. In the preferred embodiment, the algorithm used by the recompressor 26 for graphics files is a variable-loss (which includes no loss) compression algorithm called "GT", available from the former Johnson-Grace, Inc. of Newport Beach, Calif. (now America Online, of Virginia). This algorithm can give file sizes from 15% (for zero loss) to 70% smaller than the GIF standard, depending on desired degree of loss. Other algorithms, or combinations of algorithms, may be used, such as Huffman Coding, Lempel-Ziv '77, Lempel-Ziv '78, and Lempel-Ziv-Welch algorithms for lossless compression, and MPEG, JPEG, wavelet, and fractal algorithms for lossy compression.

After passing through the recompressor 26, the recompressed data passes along a third connection 27 back to the web proxy server 10' for transmission to the requester 2'.

As an optional step, the recompressed file may be cached in that form within the web proxy server 10' in a mass storage cache 22 (FIG. 2), so that faster response can be provided to requestors 2' for frequently requested pre-compressed files. Any caching algorithm may be used, such as a conventional "least recently used" (LRU) algorithm, to manage the cache 22. Alternatively, the web proxy server 10' may maintain a log of file requests, and select files to be recompressed and cached based upon logged request frequencies. Caching may be done on-line, while recompressing files, or off-line, using logged request frequencies to retrieve "popular" files and recompress them during idle time for the web proxy server 10'.

As another option, the recompression server 20 may compress requested but previously uncompressed files. This aspect of the invention is advantageously used with the caching option, since frequently requested uncompressed files can be compressed and cached within the recompression server 20 so that network bandwidth is conserved each time such a file is requested thereafter.

The invention may be implemented as a computer program storable on a media that can be read by a computer system, such as a web proxy server 10', so as to configure the computer system to provide the functions described herein. Again, while the invention has been described as if executed on a separate processor, it may be implemented as a software process executed within the web proxy server 10'.

Figure 4:
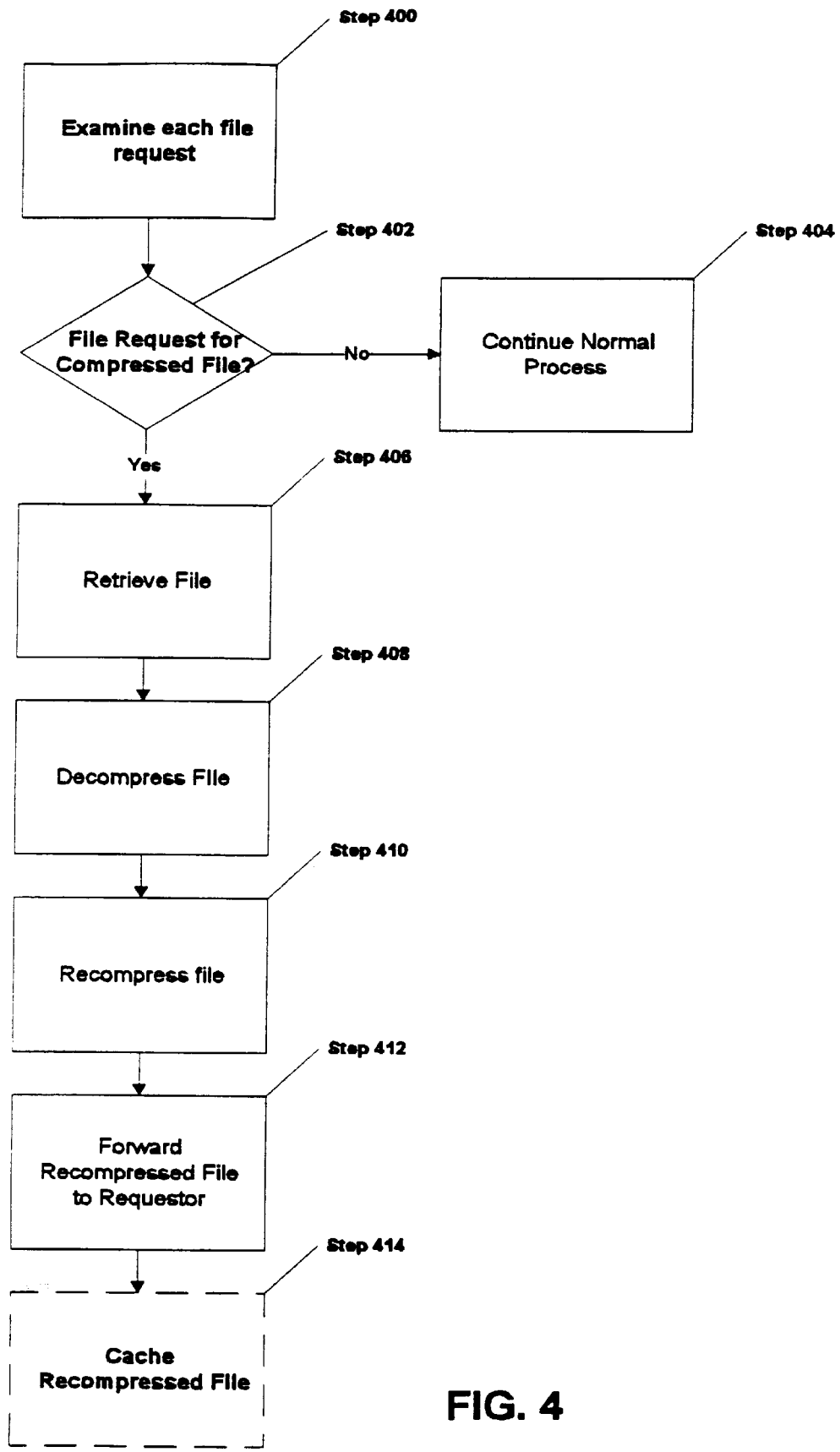
FIG. 4 is a flowchart showing the method of a first embodiment of the present invention.

FIG. 4 is a flowchart showing the method of a first embodiment of the present invention. The web proxy server 101 examines each file request from a requestor 2' to determine from the request itself that the requested file is pre-compressed (for example, by examining the file extension) (STEP 400). If the requested file is not pre-compressed (STEP 402), the web proxy server 10' continues normal processing (STEP 404).

If the requested file is pre-compressed (STEP 402), the file is retrieved in conventional fashion from the provider 4' (STEP 406). The file is then decompressed in the decompressor 24 (STEP 408) and recompressed in the recompressor 26 (STEP 410). The recompressed file is then forwarded to the requestor 2' in conventional fashion (STEP 412).

As an optional step, the recompressed file may be cached in that form within the web proxy server 10' in a mass storage cache 22 (STEP 414).

Figure 5:
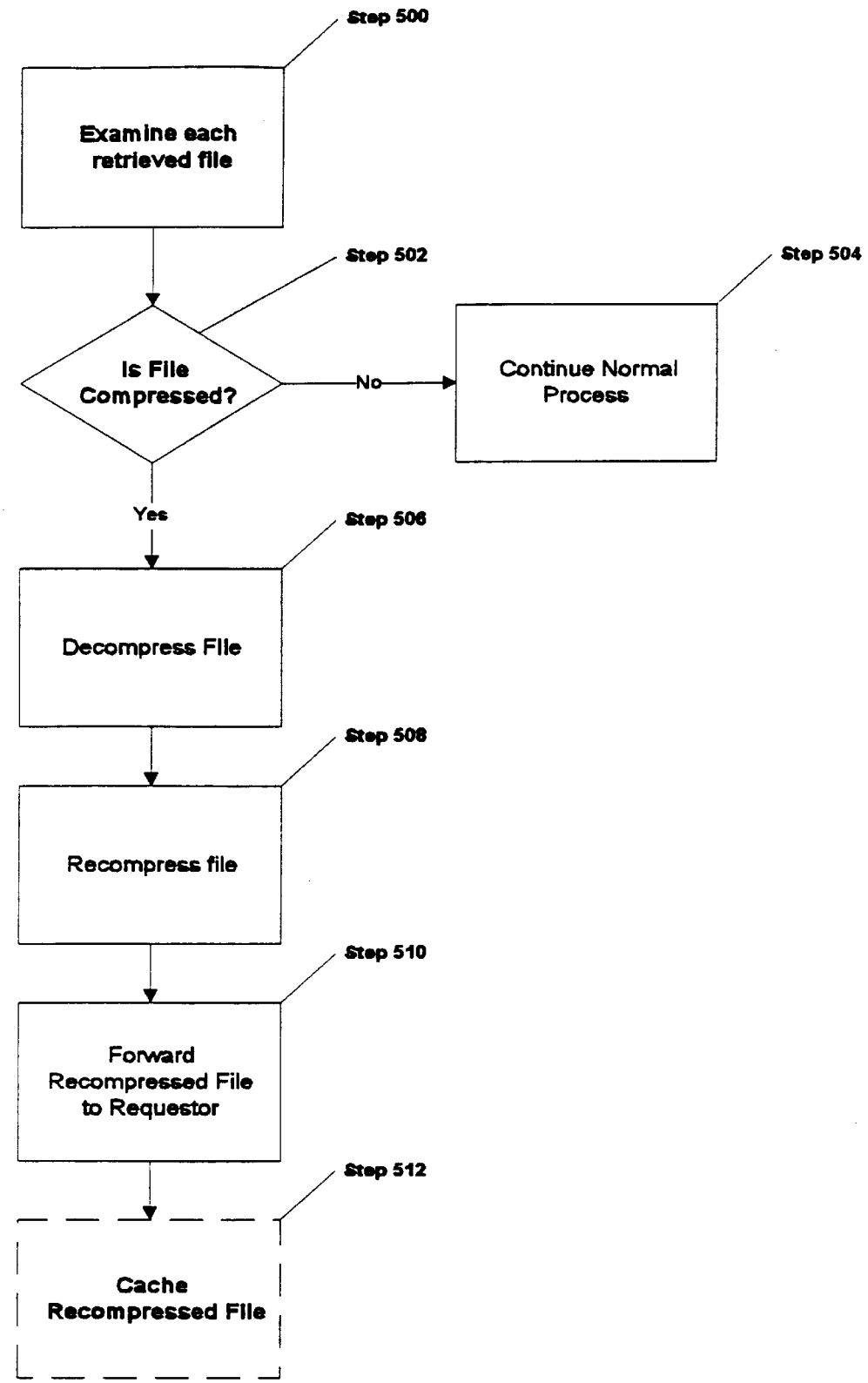
FIG. 5 is a flowchart showing the method of a second embodiment of the present invention.

FIG. 5 is a flowchart showing the method of a second embodiment of the present invention. In this embodiment, rather than examining a file request from a requestor 2' to determine if a file is pre-compressed, as in the method shown in FIG. 4, files are retrieved in conventional fashion and then examined within the web proxy server 10' (STEP 500). Whether a file is pre-compressed or not may be determined by examination of the file extension (for example, .GIF or .TIF), or key bytes within a file header, or any other characteristic or attribute of the file that indicates compression.

If the requested file is not pre-compressed (STEP 502), the web proxy server 10' continues normal processing (STEP 504). If the requested file is pre-compressed (STEP 502), the file is then decompressed in the decompressor 24 (STEP 506) and recompressed in the recompressor 26 (STEP 508). The recompressed file is then forwarded to the requester 2' in conventional fashion (STEP 510).

As an optional step, the recompressed file may be cached in that form within the web proxy server 10' in a mass storage cache 22 (STEP 512).

In an alternative embodiment, rather than recompressing every compressed file or compressing every previously uncompressed file, additional testing may be done to decide whether the inventive process described above provides a time savings in transmission over simply retransmitting a requested file. For example, if a requested compressed file is small, the time required to decompress it and recompress it may exceed the time required to transfer it unchanged. In general, if $T_T$ is the estimated transfer time for a file, $T_D$ is the estimated decompression time (zero for an uncompressed file), and $T_R$ is the estimated recompression time (initial compression time if the file is originally uncompressed), then the invention should only be used where $T_R+T_D<T_T$. Estimates for $T_T$ can be readily obtained by measuring the actual bit rate to a particular requestor, in known fashion. Estimates for $T_R$ and $T_D$ can be generated by first performing, in a preparation stage, a statistical analysis of actual decompression and recompression times versus file size for each compression type (e.g., GIF, TIFF, JPEG, etc.). Thus, by knowing the size of a particular requested file, an estimate can be readily determined for $T_R$ and $T_D$ by extrapolation. Alternatively, an estimate for $T_R$ and $T_D$ can be generated by decompressing a portion of a file and concurrently attempting to recompress that portion, timing each action, and extrapolating to the entire file size.

Referring to FIG. 4, this type of testing can be done before STEP 408. If the test indicates that $T_R+T_D$ is less than $T_T$, then processing continues at STEP 408. Otherwise, the requested file is directly forwarded to the requestor. Referring to FIG. 5, this type of testing can be done before STEP 506. If the test indicates that $T_R+T_D$ is less than $T_T$, then processing continues at STEP 506. Otherwise, the requested file is directly forwarded to the requestor. In either method, the requested file may still be cached.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, although the invention has been described in the context of a wide area public network, it can be applied to any network (including private wide area and local area networks) in which files requested from one node by another node pass through an intermediate processor that can be programmed or configured as a recompression server. Accordingly, it is to be understood that the invention is not to be limited by the specific illustrated embodiment, but only by the scope of the appended claims.

What is claimed is:

1. A method for increasing available bandwidth in a network system comprising one or more requestor nodes, one or more provider nodes, and one or more intermediate nodes, the method comprising:
   performing the following at an intermediate node:
   (a) for each file requested from a provider node in the network system, determining whether the file is a pre-compressed file, each file including a plurality of bytes of data;
   (b) automatically decompressing, independent of the decompression capabilities of the provider node and a requester node in the network system, the pre-compressed file into decompressed data;
   (c) automatically recompressing, independent of the compression capabilities of the provider node and the requestor node, the decompressed data into a recompressed file having a greater degree of compression than the pre-compressed file; and
   (d) providing the recompressed file to the requestor node.

2. The method of claim 1 wherein determining whether a file is pre-compressed includes examining a file request from the requester node before retrieving the pre-compressed file.

3. The method of claim 1 wherein determining whether a file is pre-compressed includes examining a retrieved file.

4. The method of claim 1, further including caching the recompressed file.

5. The method of claim 1, further including:
   (a) before decompressing, determining whether an estimated time required to directly provide the pre-compressed file to the requester node would be less than an estimated time to decompress the pre-compressed file and generate the recompressed file; and
   (b) if not, then continuing with the decompressing, and if so, then providing the pre-compressed file directly to the requestor node.

6. The method of claim 1 in which the intermediate node comprises a proxy server.

7. A method for increasing available bandwidth in a network system comprising one or more requestor nodes, one or more provider nodes, and one or more intermediate nodes, the method comprising:
   performing the following at an intermediate node:
   (a) for each file requested from a provider node in the network system, determining whether the file is an uncompressed file, each file including a plurality of bytes of data;
   (b) automatically compressing, independent of the compression capabilities of the provider node and a requester node in the network system, the uncompressed file into a compressed file having a length shorter than the uncompressed file;
   (c) providing the compressed file to the requester node; and
   (d) caching the compressed file.

8. The method of claim 7, further including:
   (a) before compressing, determining whether an estimated time required to directly provide the uncompressed file to the requestor node would be less than an estimated time to compress the uncompressed file; and
   (b) if not, then continuing with the compressing, and if so, then providing the uncompressed file directly to the requestor node.

9. The method of claim 7 in which the intermediate node comprises a proxy server.

10. A method for increasing available bandwidth in a network system comprising one or more requestor nodes, one or more provider nodes, and one or more intermediate nodes, the method comprising:
    performing the following at an intermediate node:
    (a) for each file requested from a provider node in the network system, examining a request for the file to determine if the requested file is pre-compressed, each file including a plurality of bytes of data;
    (b) retrieving the requested file from the provider node in the network system;
    (c) if the requested file is pre-compressed, automatically decompressing, independent of the decompression capabilities of the provider node and a requestor node in the network system, the retrieved pre-compressed file into decompressed data;
    (d) automatically recompressing, independent of the compression capabilities of the provider node and the requester node, the decompressed data into a recompressed file having a greater degree of compression than the pre-compressed file; and
    (e) providing the recompressed file to the requester node.

11. The method of claim 10, further including caching the recompressed file.

12. The method of claim 10, further including:
    (a) before decompressing, determining whether an estimated time required to directly provide the pre-compressed file to the requester node would be less than an estimated time to decompress the pre-compressed file and generate the recompressed file; and
    (b) if not, then continuing with the decompressing, and if so, then providing the pre-compressed file directly to the requester node.

13. The method of claim 10 in which the intermediate node comprises a proxy server.

14. A method for increasing available bandwidth in a network system comprising one or more requestor nodes, one or more provider nodes, and one or more intermediate nodes, the method comprising:
    performing the following at an intermediate node:
    (a) for each file requested from a provider node in the network system, retrieving a file from the provider node, each file having a plurality of bytes of data;

(b) examining the retrieved file to determine if the retrieved file is pre-compressed;

(c) if the retrieved file is pre-compressed, automatically decompressing, independent of the decompression capabilities of the provider node and a requester node in the network system, the retrieved pre-compressed file into decompressed data;

(d) automatically recompressing, independent of the compression capabilities of the provider node and the requester node, the decompressed data into a recompressed file having a greater degree of compression than the pre-compressed file; and (e) providing the recompressed file to the requestor node.

15. The method of claim 14, further including caching the recompressed file.

16. The method of claim 14, further including:
(a) before the step of decompressing, determining whether an estimated time required to directly provide the pre-compressed file to the requester node would be less than an estimated time to decompress the pre-compressed file and generate the recompressed file;
(b) if not, then continuing with the decompressing, and if so, then providing the pre-compressed file directly to the requestor node.

17. The method of claim 14 in which the intermediate node comprises a proxy server.

18. An apparatus for increasing available bandwidth in a network system comprising one or more requestor nodes, one or more provider nodes, and one or more intermediate nodes, the apparatus comprising:
performing the following at an intermediate node:
(a) means for determining whether each file requested from a provider node in the network system is a pre-compressed file, each file including a plurality of bytes of data;
(b) a decompressor for automatically decompressing, independent of the decompression capabilities of the provider node and a requester node in the network system, the pre-compressed file into decompressed data;
(c) a recompressor for automatically recompressing, independent of the compression capabilities of the provider node and the requester node, the decompressed data into a recompressed file having a greater degree of compression than the pre-compressed file; and
(d) means for providing the recompressed file to the requestor node.

19. The apparatus of claim 18 wherein the means for determining whether a file is pre-compressed includes means for examining a file request from the requestor node before retrieving the pre-compressed file.

20. The apparatus of claim 18 wherein the means for determining whether a file is pre-compressed includes means for examining a retrieved file.

21. The apparatus of claim 18, further including a cache for storing the recompressed file.

22. The apparatus of claim 18, further including a testing means for determining whether an estimated time required to directly provide the pre-compressed file to the requester node would be less than an estimated time to decompress the pre-compressed file and generate the recompressed file, and if so, then providing the pre-compressed file directly to the requester node.

23. The apparatus of claim 18 in which the intermediate node comprises a proxy server.

24. An apparatus for increasing available bandwidth in a network system comprising one or more requester nodes, one or more provider nodes, and one or more intermediate nodes, the apparatus comprising:
an intermediate node comprising:
(a) means for determining whether each file requested from a provider node in the network system is an uncompressed file, each file including a plurality of bytes of data;
(b) a compressor for automatically compressing, independent of the compression capabilities of the provider node and a requester node in the network system, the uncompressed file into a compressed file having a length shorter than the uncompressed file;
(c) means for providing the compressed file to the requestor node; and
(d) a cache for storing the compressed file.

25. The apparatus of claim 24, further including a testing means for determining whether an estimated time required to directly provide the uncompressed file to the requester node would be less than an estimated time to compress the uncompressed file, and if so, then providing the uncompressed file directly to the requestor node.

26. The apparatus of claim 24 in which the intermediate node comprises a proxy server.

27. An apparatus for increasing available bandwidth in a network system comprising one or more requestor nodes, one or more provider nodes, and one or more intermediate nodes, the apparatus comprising:
an intermediate node comprising:
(a) for each file requested from a provider node in the network system, means for examining a request for the file to determine if the file is pre-compressed, each file including a plurality of bytes of data;
(b) means for retrieving the requested file from the provider node in the network system;
(c) a decompressor for automatically decompressing, independent of the decompression capabilities of the provider node and a requester node in the network system, the retrieved pre-compressed file into decompressed data;
(d) a recompressor for automatically recompressing, independent of the compression capabilities of the provider node and the requester node, the decompressed data into a recompressed file having a greater degree of compression than the pre-compressed file; and
(e) means for providing the recompressed file to the requestor node.

28. The apparatus of claim 27, further including a cache for storing the recompressed file.

29. The apparatus of claim 27, further including a testing means for determining whether an estimated time required to directly provide the pre-compressed file to the requester node would be less than an estimated time to decompress the pre-compressed file and generate the recompressed file, and if so, then providing the pre-compressed file directly to the requester node.

30. The apparatus of claim 27 in which the intermediate node comprises a proxy server.

31. An apparatus for increasing available bandwidth in a network system comprising one or more requestor nodes, one or more provider nodes, and one or more intermediate nodes, the apparatus comprising:
an intermediate node comprising:
(a) for each file requested from a provider node in the network system, means for retrieving the file from the provider node, each file including a plurality of bytes of data;

(b) means for determining that the retrieved file is pre-compressed;

(c) a decompressor for automatically decompressing, independent of the decompression capabilities of the provider node and a requester node in the network system, the retrieved pre-compressed file into decompressed data;

(d) a recompressor for automatically recompressing, independent of the compression capabilities of the provider node and the requestor node, the decompressed data into recompressed file having a greater degree of compression than the pre-compressed file; and (e) means for providing the recompressed file to the requester node.

32. The apparatus of claim 31, further including a cache for storing the recompressed file.

33. The apparatus of claim 31, further including a testing means for determining whether an estimated time required to directly provide the pre-compressed file to the requestor node would be less than an estimated time to decompress the pre-compressed file and generate the recompressed file, and if so, then providing the pre-compressed file directly to the requestor node.

34. The apparatus of claim 31 in which the intermediate node comprises a proxy server.

35. A computer program for increasing available bandwidth in a network system comprising one or more requestor nodes, one or more provider nodes, and one or more intermediate nodes, the computer program being tangibly stored on media readable by a computer system, for configuring the computer system upon being executed to perform the following functions at an intermediate node:

(a) for each file requested from a provider node in the network system, determining whether the file is a pre-compressed file, each file including a plurality of bytes of data;

(b) automatically decompressing, independent of the decompression capabilities of the provider node and a requester node in the network system, the pre-compressed file into decompressed data;

(c) automatically recompressing, independent of the compression capabilities of the provider node and the requester node, the decompressed data into a recompressed file having a greater degree of compression than the pre-compressed file; and (d) providing the recompressed file to the requestor node.

36. The computer program of claim 35 wherein the function of determining whether a file is pre-compressed includes examining a file request from the requestor node before retrieving the pre-compressed file.

37. The computer program of claim 35 wherein the function of determining whether a file is pre-compressed includes examining a retrieved file.

38. The computer program of claim 35, further including the function of caching the recompressed file.

39. The computer program of claim 35, further including the functions of:

(a) before decompressing, determining whether an estimated time required to directly provide the pre-compressed file to the requester node would be less than an estimated time to decompress the pre-compressed file and generate the recompressed file; and (b) if not, then continuing with the decompressing, and if so, then providing the pre-compressed file directly to the requestor node.

40. The computer program of claim 35 in which the intermediate node comprises a proxy server.

41. A computer program for increasing available bandwidth in network system comprising one or more requestor nodes, one or more provider nodes, and one or more intermediate nodes, the computer program being tangibly stored on a media readable by a computer system, for configuring the computer system upon being executed to perform the following functions at an intermediate node:

(a) for each file requested from a provider node in the network system, determining whether the file is an uncompressed file, each file including a plurality of bytes of data;

(b) automatically compressing, independent of the compression capabilities of the provider node and a requester node in the network system, the uncompressed file into a compressed file having a length shorter than the uncompressed file;

(c) providing the compressed file to the requester node; and (d) caching the compressed file.

42. The computer program of claim 41, further including the functions of:

(a) before compressing, determining whether an estimated time required to directly provide the uncompressed file to the requestor node would be less than an estimated time to compress the uncompressed file; and (b) if not, then continuing with the compressing, and if so, then providing the uncompressed file directly to the requestor node.

43. The computer program of claim 41 in which the intermediate node comprises a proxy server.

44. A computer program for increasing available bandwidth in network system comprising one or more requester nodes, one or more provider nodes, and one or more intermediate nodes, the computer program being tangibly stored on a media readable by a computer system, for configuring the computer system upon being executed to perform the following functions at an intermediate node:

(a) for each file requested from a provider node in the network system, examining a request for the file to determine if the file is pre-compressed, each file including a plurality of bytes of data;

(b) retrieving the requested file from the provider node in the network system;

(c) if the requested file is pre-compressed, automatically decompressing, independent of the decompression capabilities of the provider node and a requestor node in the network system, the retrieved pre-compressed file into decompressed data;

(d) automatically recompressing, independent of the compression capabilities of the provider node and the requester node, the decompressed data into a recompressed file, the recompressed file having a greater degree of compression than the pre-compressed file; and (e) providing the recompressed file to the requester node.

45. The computer program of claim 44, further including the function of caching the recompressed file.

46. The computer program of claim 44, further including the functions of:

(a) before decompressing, determining whether an estimated time required to directly provide the pre-compressed file to the requester node would be less than an estimated time to decompress the pre-compressed file and generate the recompressed file; and (b) if not, then continuing with the decompressing, and if so, then providing the pre-compressed file directly to the requester node.

47. The computer program of claim 44 in which the intermediate node comprises a proxy server.

48. A computer program for increasing available bandwidth in a network system comprising one or more requestor nodes, one or more provider nodes, and one or more intermediate nodes, the computer program being tangibly stored on media readable by a computer system, for configuring the computer system upon being executed to perform the following functions at an intermediate node:

(a) for each file requested from a provider node in the network system, retrieving a file from the provider node, each file including a plurality of bytes of data;

(b) examining the retrieved file to determine if the file is pre-compressed;

(c) if the retrieved file is pre-compressed, automatically decompressing, independent of the decompression capabilities of the provider node and a requestor node in the network system, the retrieved pre-compressed file into decompressed data;

(d) automatically recompressing, independent of the compression capabilities of the provider node and the requester node, the decompressed data into a recompressed file having a greater degree of compression than the pre-compressed file; and (e) providing the recompressed file to the requester node.

49. The computer program of claim 48, further including the function of caching the recompressed file.

50. The computer program of claim 48, further including the functions of:

(a) before decompressing, determining whether an estimated time required to directly provide the pre-compressed file to the requester node would be less than an estimated time to decompress the pre-compressed file and generate the recompressed file; and (b) if not, then continuing with the decompressing, and if so, then providing the pre-compressed file directly to the requester node.

51. The computer program of claim 48 in which the intermediate node comprises a proxy server.

52. A method of increasing available bandwidth in a network system comprising a requester node, a provider node, and an intermediate node, the method comprising:

performing the following at the intermediate node in a manner that is transparent to the requester node and the provider node:

(a) receiving a request from the requester node to access a requested file on the provider node;

(b) retrieving the requested file from the provider node;

(c) determining whether the requested file existed in a compressed state on the provider node;

(d) if the requested file existed in a compressed state on the provider node, then automatically decompressing the requested file and generating a recompressed file having a degree of compression greater than the requested file residing on the provider node; and (e) transmitting the recompressed file to the requester node.

53. The method of claim 52, wherein determining whether the requested file existed in a compressed state on the provider node includes examining the request from the requester node before retrieving the requested file from the provider node.

54. The method of claim 53 wherein examining the request from the requestor node comprises determining a file extension type of the requested file.

55. The method of claim 52, wherein determining whether the requested file existed in a compressed state on the provider node includes examining the requested file after retrieving the requested file from the provider node.

56. The method of claim 52, further including caching the recompressed file.

57. The method of claim 52, further including:

(a) before decompressing, determining whether an estimated time required to directly provide the requested file to the requester node would be less than an estimated time to decompress the requested file and generate the recompressed file; and (b) if not, then continuing with generating the recompressed file, and if so, then providing the requested file directly to the requester node.

58. The method of claim 52 in which the intermediate node comprises a proxy server.

* * * * *